US005533851A

United States Patent [19]
Remmers

[11] Patent Number: 5,533,851
[45] Date of Patent: Jul. 9, 1996

[54] HOLLOW WALL ANCHOR

[75] Inventor: Lee Remmers, Ocala, Fla.

[73] Assignee: Clairson, Inc., Newark, Del.

[21] Appl. No.: 315,908

[22] Filed: Sep. 30, 1994

[51] Int. Cl.⁶ .............................. F16B 13/06; F16B 21/00
[52] U.S. Cl. ............................ 411/344; 411/45; 411/60
[58] Field of Search ............................ 411/45–48, 340, 411/344, 345, 346, 41, 57, 60

[56] References Cited

U.S. PATENT DOCUMENTS

| 2,033,100 | 3/1936 | Kellogg | 72/105 |
|---|---|---|---|
| 2,555,420 | 6/1951 | Richardson . | |
| 3,188,905 | 6/1965 | Millet . | |
| 3,650,173 | 3/1972 | Mathe | 411/45 |
| 4,264,047 | 4/1981 | Nelson | 248/73 |
| 4,274,324 | 6/1981 | Giannuzzi | 411/38 |
| 4,312,614 | 1/1982 | Palmer et al. | 411/44 |
| 4,361,099 | 11/1982 | Kokenge et al. | 108/152 |
| 4,624,376 | 11/1986 | Bertram | 211/187 |
| 4,637,765 | 1/1987 | Omata | 411/41 |
| 4,646,998 | 3/1987 | Pate | 248/250 |
| 4,662,595 | 5/1987 | Camilleri | 248/250 |
| 4,669,936 | 6/1987 | Camilleri | 411/340 |
| 4,693,248 | 9/1987 | Failla | 411/339 X |
| 4,708,552 | 11/1987 | Bustos et al. | 411/60 |
| 4,722,648 | 2/1988 | Camilleri | 411/340 |

FOREIGN PATENT DOCUMENTS

| 1000131 | 8/1965 | United Kingdom | 411/45 |

*Primary Examiner*—Neill R. Wilson
*Attorney, Agent, or Firm*—Middleton & Reutlinger; Charles G. Lamb

[57] ABSTRACT

A wall anchor for installation in a hole drilled in a wall having a head, a barrel, and a pair of parallel fingers. The head is attached to one end of the barrel and the pair of parallel fingers are attached to the opposite end of the barrel wherein each of the fingers is provided with one end pivotally attached to the barrel and the opposite ends are free from connection whereby the fingers can be spread apart by driving a pin therethrough. The head and the barrel are provided with aligned circumferential bores extending longitudinally therethrough. A flat portion is provided along one arcuate segment of one of the bores.

6 Claims, 1 Drawing Sheet

HOLLOW WALL ANCHOR

BACKGROUND OF THE INVENTION

This invention relates to wall anchors for fastening fixtures and other objects to a wall. More particularly, this invention relates to a hollow barrel wall anchor having a pin holding device disposed within the barrel of the anchor.

In walls formed of plaster boards, sheet rock, plywood and other relatively thin or soft panel materials, problems arise when attempting to mount objects to these walls, particularly, transverse rods for draperies, drapes, lighting fixtures, picture frames and other objects which impose stress upon these walls. These walls are usually incapable of receiving the aforementioned rods, fixtures and picture frames which are held in place by standard screws and bolts. Thus, it has become common practice to use anchoring sockets of some sort in order to secure these objects to a wall. A number of wall anchors are noted in the prior art, particularly U.S. Pat. Nos. 4,274,324; 2,555,420; 3,188,905; and 4,312,614.

U.S. Pat. Nos. 4,669,936 and 4,722,648 teach a back clip for mounting a shelf to a wall comprising a clip body with a downwardly extending hook portion to receive a shelf wire therein. These back clips include a body portion with a hollow barrel therein and laterally expandable fingers in alignment therewith. The fingers extend through a wall and upon receiving a bolt or pin through the barrel, the laterally expandable fingers expand against the inside portion of the wall. The barrel portion is provided with a plurality of ribs for holding the bolt or pin in place prior to driving the bolt or pin through the barrel and expanding the fingers for attaching the back clip to a wall.

SUMMARY OF THE INVENTION

An object of the present invention is to provide a wall anchor which when installed in a wall is securely held therein.

Another object of the present invention is to provide a wall anchor having a barrel portion therein of generally cylindrical shape with a part of one arcuate segment being flat to hold a mounting bolt or pin therein prior to mounting to a wall.

Even another object of this invention is to provide a wall anchor which can be installed in a wall to support objects therefrom.

A further object of this invention is to provide a wall anchor made of plastic to which a wall mounting bolt is held securely therein during transit.

An even further object of this invention is to provide a wall anchor made of plastic which is of unitary construction, simple in design, and easy to produce in mass quantities.

More particularly, the present invention provides a wall anchor for installation in a hole drilled in a wall comprising:

a head;

a barrel having one end attached to the head and an opposite end attached to a pair of parallel fingers, each of said fingers having one end pivotally attached to the barrel and having opposite ends free from connection whereby said fingers can be spread apart by driving a pin therethrough;

said head and said barrel having aligned circumferential bores extending longitudinally therethrough, at least one of said head or said barrel having a flat portion along one arcuate segment of one of said bores; and, said head having an outer diameter greater than an outer diameter of said barrel.

Further objects and advantages of this invention will appear from the following description and appended claims, reference being had to the accompanying drawings forming a part of the specification wherein like reference characters designate corresponding parts into several views.

DETAILED DESCRIPTION OF THE PREFERRED EMBODIMENT

Figure 1:
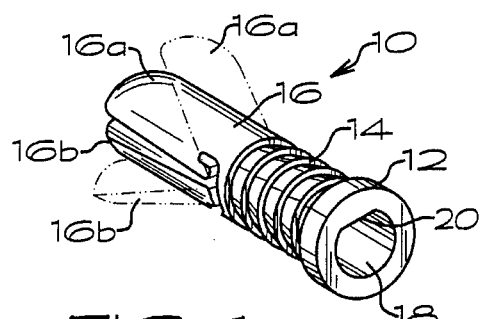
FIG. 1 is a perspective view of one preferred wall anchor of the present invention.
Figure 2:
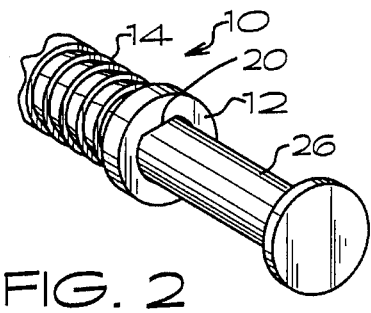
FIG. 2 is a partial perspective view of the wall anchor of FIG. 1 including a mounting pin therein.
Figure 3:
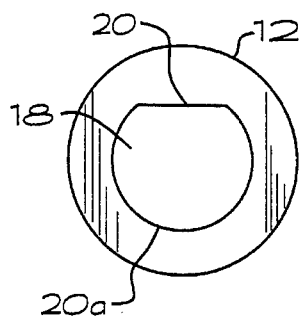
FIG. 3 is an end view of the wall anchor of FIG. 1.
Figure 4:
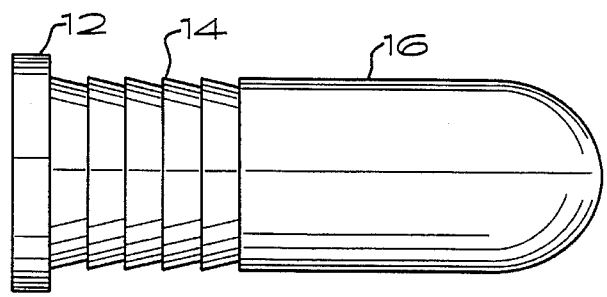
FIG. 4 is a side view of a wall anchor of FIG. 1.
Figure 5:
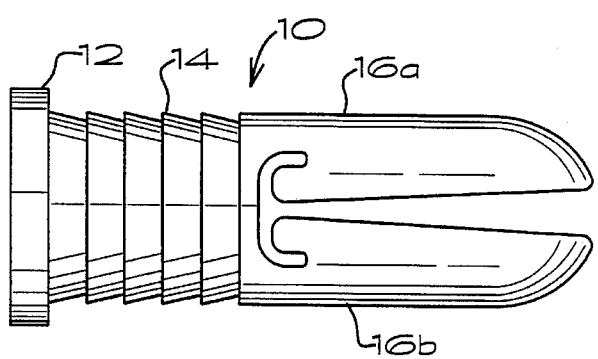
FIG. 5 is a top view of a wall anchor of FIG. 1.
Figure 6:
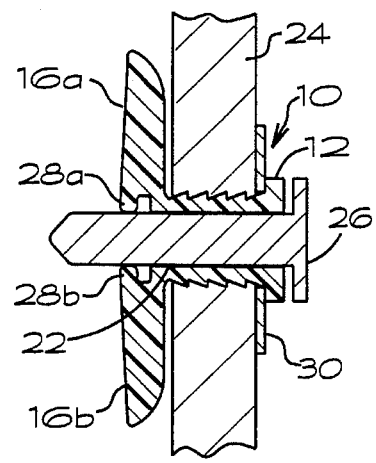
FIG. 6 is a top sectional view of the wall anchor of FIG. 1 mounted to a supporting wall.

Referring to FIG. 1, and FIG. 4, a wall anchor 10 of the present invention includes a generally flat circular head 12, a barrel 14 and a pair of flexible and resilient fingers 16a and 16b which are joined to the barrel 14 at its back end. The head 12 is of disc-like configuration and is of a greater outer diameter than the outer diameters of the barrel 14 and the fingers 16a, 16b. The head 12 is further provided with a through-bore 18 therein which is in alignment with a through-bore 22 (FIG. 6) in the barrel 14. The through-bores 18 and 22 receive a mounting pin 26 (FIG. 2 and FIG. 6) therethrough. Cylindrical bore 18 is provided with a flat portion 20 along one arcuate segment wherein the flat portion 20 in cooperating relation with its opposite arcuate segment 20a (FIG. 3) of the bore 18, grip and hold the pin 26 in place. The flat portion 20 generally replaces an arcuate segment of from about 7.2% to about 14.5% of the bores 18 and/or 22. Furthermore, the axial length of the flat portion is preferably about 0.500 inches in a standard anchor having a though-bore of from 0.149 to 1.162 inches in diameter and 0.514 inches in axial length. Holiday pin 26 in place is particularly useful in that wall anchor 10 can be shipped with the pin 26 already therein for mounting to a wall. As shown in FIG. 6, wall anchor 10 can be easily installed to hold an object 30, such as an edge of a picture frame, a clip for a drapery rod, and like thereon.

The pair of flexible and resilient fingers 16a and 16b are joined to the barrel section 14 its back end, the upper resilient finger 16a being above or to one side of the through-bore 22 and the lower resilient 16b being disposed below or to an opposite side of the through-bore 22. At the connecting end between the fingers 16a and 16b and the barrel 14 are should 28a and 28b. As shown, should 28a extends downward from the upper finger 16a from its attachment to the barrel 14 and lower finger 16b presents a similar upward extending shoulder 28b. Normally, as seen in FIG. 1 and particularly in the phantom line in FIG. 1, the fingers 16a and 16b are resilient but may be squeezed together manually before being inserted in an opening in a wall 24 (FIG. 6), if necessary. preferably, the opening in the wall 24 is of a size and shape such that the barrel 14 of the wall anchor 10 has to be force fitted therein. Preferably also, the axial length of the barrel 14 is substantially equal to the thickness of the wall 24 into which the wall anchor 10 is to be inserted so that when the back surface of the head 12 is flush against an object 30 (FIG. 6), the fingers 16a and 16b on the wall anchor 10 will assume their undeformed position shown in FIG. 1. When the mounting pin 26 (FIG. 2 and FIG. 6) is inserted through the through-bores 18 and 22, the pin will engage the shoulders 28a and 26b and spread the fingers 16a and 16b apart, as best shown in FIG. 6.

preferably wall anchor 10 is of unitary construction of a suitable resilient plastic material, one preferred resilient plastic being polypropylene.

It is realized that various changes may be made by those skilled in the art and the preferred embodiment previously described without departing from the principles and scope of the invention as expressed in the claims appended hereto.

What is claimed is:

1. A wall anchor for installation in a hole drilled in a wall comprising:

a head;

a barrel having one end attached to the head and an opposite end attached to a pair of parallel fingers, each of said fingers having one end pivotally attached to the barrel and having opposite ends free from connection whereby said fingers can be spread apart by driving a pin therethrough;

said head and said barrel having aligned circumferential bores extending longitudinally therethrough, said at least one of said bores of said head or said barrel having a flat portion along one arcuate segment; and, said head having an outer diameter greater than an outer diameter of said barrel.

2. The wall anchor of claim 1 including a pin inserted into said bore of said head portion.

3. The wall anchor of claim 1, said wall anchor being of unitary construction.

4. The wall anchor of claim 1, said wall anchor being made of a resilient plastic material.

5. The wall anchor of claim 1, said flat portion being in said bore of said head.

6. The wall anchor of claim 1, said flat portion replacing from 7.2% to 14.5% of an arcuate segment of said bores.

* * * * *